Figure 1:
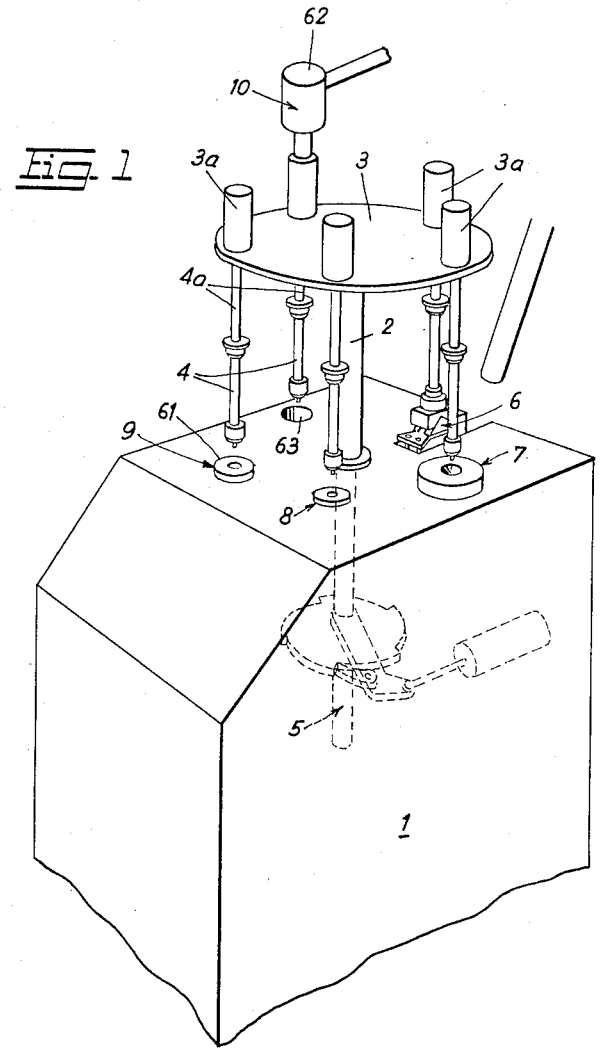

Aug. 3, 1965 L. HAUF 3,198,349
LOADING DEVICE FOR MACHINE WORKING ON TUBULAR WORKPIECES
Filed July 26, 1963 2 Sheets-Sheet 1

Inventor
Lazare Hauf

By Stevens, Davis, Miller & Mosher
Attorneys

Aug. 3, 1965  L. HAUF  3,198,349
LOADING DEVICE FOR MACHINE WORKING ON TUBULAR WORKPIECES
Filed July 26, 1963  2 Sheets-Sheet 2

Inventor
Lazare Hauf

By Stevens, Davis, Miller & Mosher
Attorneys

3,198,349
LOADING DEVICE FOR MACHINE WORKING ON TUBULAR WORKPIECES
Lazare Hauf, Chemin de Boissonnet 11,
Lausanne, Vaud, Switzerland
Filed July 26, 1963, Ser. No. 297,761
Claims priority, application Switzerland, July 28, 1962,
9,078/62
3 Claims. (Cl. 214—1)

This invention relates to loading devices for machines working on tubular workpieces and in particular to devices adapted for loading tube jackets on to guiding members of machines making tube heads and welding the same to the prefabricated tube jackets.

It is an object of the invention to provide a loading device which can be mounted in the loading station of a machine comprising a plurality of identical guiding members shiftably mounted in regularly staggered positions on an indexable disc.

Further objects of the invention will still become apparent in the course of the following description.

One embodiment of the loading device according to the invention is represented diagrammatically and by way of example in the accompanying drawings.

Figure 2:
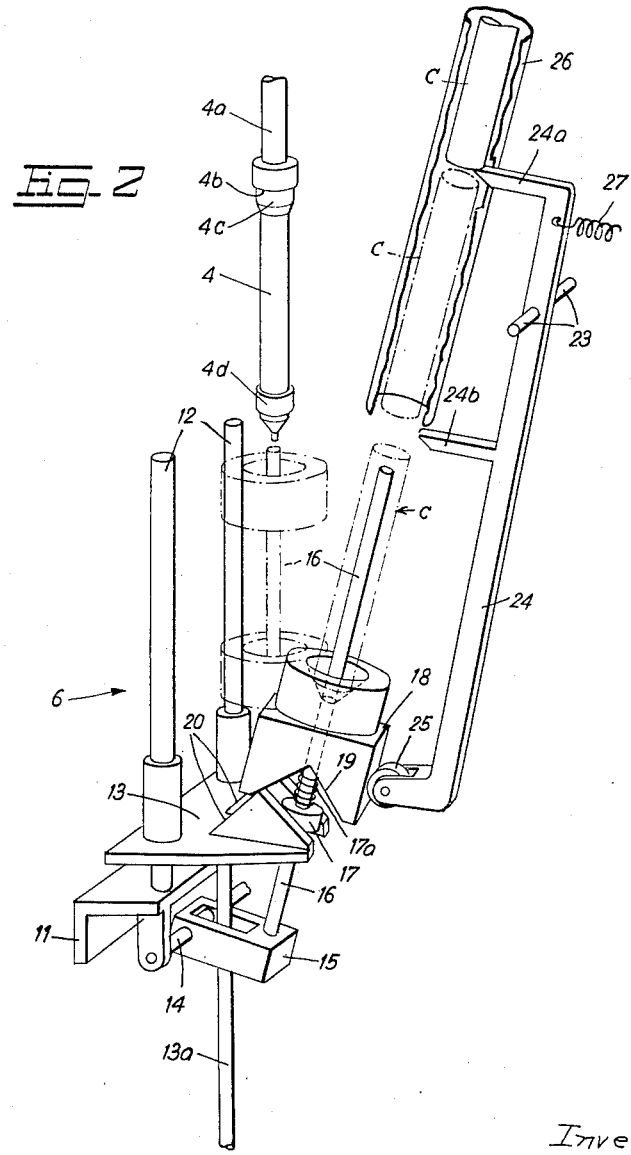

In the drawings:

FIG. 1 is a diagrammatic simplified perspective view of a plastic molding machine with which the loading device according to the invention is associated, and FIG. 2 is a perspective view on a larger scale of the loading device.

The machine represented in FIG. 1 comprises a frame 1 in which a vertical shaft 2 is journalled. This shaft 2 carries a rotary disc 3 at its upper end.

A circular row of bearings 3a is fixed to disc 3. Each bearing 3a guides the upper part 4a of a vertical mandrel 4 extending downwards from disc 3. Return springs (not shown) are located in the housings of bearings 3a and act on mandrels 4 so as to return and hold these mandrels in an upmost resting position. A control device (not shown), which may comprise a pneumatic or hydraulic cylinder and a piston, is mounted above the bearing 3a of each station in which the mandrel 4 has to be moved in axial direction. An indexing device 5 of a type well known in the art serves to drive shaft 2, disc 3 and mandrels 4 step by step around a vertical axis in order to bring the mandrels 4 in successive working positions opposite devices 6, 7, 8, 9 and 10, the axes of which are also vertical and coincide with those of mandrel 4, when the latter are at rest in their working positions after each indexing operation. The first of these devices is the loading device 6, which serves to set a prefabricated tube jacket c (FIG. 2) on to the mandrel 4 standing opposite device 6, at the loading station of the machine. A second of these devices, 7, comprises a molding die and means for introducing a metered load of plastified material therein, this second device thereby serving to mold a tube head and to weld the same to the tube jacket c. The third device 8 serves to remove by punching the membrane closing the upper end of the head which has been molded by device 7. The device 9 serves to screw a tube cap onto the tube head and the last device 10 serves to remove the tube, which has been manufactured by the machine, from the mandrel which carried the same, said tube being blown into an opening 63 provided in the upper plate of the machine frame 1. The mandrel 4 thus serves to guide the tubular workpieces set thereon in every working station of the machine.

It should be understood that the machine has been represented in FIG. 1 in an extremely simplified way and that this machine further comprises numerous auxiliary devices (not shown) which are in part mechanical devices and in part electrical devices and which serve to actuate the devices 5–10 and to synchronize the operations thereof.

The loading device 6 is represented in detail in FIG. 2, which also shows the mandrel 4 standing at the loading station, opposite device 6. A supporting bracket 11 secured to the machine frame carries a pair of vertical guiding rods 12, on which a control member 13 is mounted for shifting motion. Member 13 is secured to the upper end of a rod 13a connected to a hydraulic piston (not shown) adapted for reciprocating member 13 along rods 12. The bracket 11 also carries an axle 14 serving as pivoting means for a transporting member comprising an arm 15 and a rod 16 fixed at its lower end to arm 15. A stop 17 associated with a spring 17a is adjustably secured to rod 16. A pusher 18 is further shiftably mounted on rod 16. Pusher 18 has a V-shaped lower camming surface 19 arranged for cooperation with a pair of triangular cams 20 provided on the upper surface of member 13 and having a shape matching with that of the lower surface 19 of pusher 18. The reference numeral 23 designates an axle which is carried by the machine frame and which serves as pivoting means for a lever 24 carrying a roller 25 at its lower end, which shall cooperate with the side surface of pusher 18. On either side of axle 23, lever 24 carries fingers 24a and 24b. The free ends of these fingers thus alternatively enter the path of the tubular work-pieces c which shall be delivered one after the other to the transporting member 16 by distributing means comprising an inclined tubular chute 26 connected to a magazine (not shown) containing a stock of prefabricated workpieces c.

In FIG. 2, the movable pieces of the loading device 6 are represented in their resting positions in which they are ready for loading a tubular workpiece c on to the mandrel 4 standing at the loading station opposite device 6. Member 13 is in its lowest possible position; rod 16 is aligned with chute 26; and pusher 18 connected to spring 17a lies on cams 20. Finger 24a of lever 24 projects into chute 26 and prevents the workpieces c lying therein from falling down. One workpiece c has, however, already dropped from chute c on to rod 16 and it lies on pusher 18.

Upon initiating the upward loading stroke of member 13, the cams 20 slide along one side of the V-shaped surface 19 of pusher 18, so that these camming means, which connect the control member 13 to the pusher 18 under the action of spring 17a, cause the transporting member comprising arm 15 and rod 16 to rock about axle 14 from its receiving position, in which rod 16 is aligned with chute 26, into its loading position, in which rod 16 is aligned with mandrel 4. At the end of this rocking motion the cams 20 are fully engaged into the V-shaped cut-out of pusher 18.

Once cams 20 have reached that position, the further upward motion of member 13 causes pusher 18 to be lifted together with workpiece c, thus pushing this workpiece on to mandrel 4. The upward loading stroke of member 13, pusher 18 and workpiece c is adjusted so that at the end thereof the upper edge of workpiece c butts against a shoulder 4b of mandrel 4. When member 13 and pusher 18 effect their return stroke and move downwards, the workpiece c is retained on mandrel 4 by the friction between this workpiece and the surface portions 4c and 4d of the mandrel 4. At the end of the return stroke, the connecting means (19, 20) inserted between member 13 and pusher 18 permit the transporting member 16 to rock from its loading position (shown in dot-and-dash lines) into its receiving position (shown in full lines) so that pusher 18 engages roller 25 and rocks lever 24 into the position represented in the drawings.

During the upward loading stroke of member 13 and pusher 18, a spring 27 caused lever 24 to rock clockwise about axle 23, thus permitting finger 24a to move out of chute 26 and finger 24b to advance simultaneously under the lower end of this chute. During this rocking motion of lever 24, the tubular workpiece c, which was previously retained by finger 24a, has been left by this finger so that it could drop onto finger 24b together with the whole column of workpieces c contained in chute 26. When lever 24 is rocked by pusher 18 against the action of spring 27 at the end of the return downward stroke of control member 13, the finger 24b is removed again from the path of the tubular workpieces c so that the workpiece retained till then by finger 24b now drops onto rod 16 as shown in dot-and-dash lines in FIG. 2. Simultaneously finger 24a enters chute 26 again and retains the remaining workpieces c therein. At this moment the loading device 6 is ready for starting a new loading operation, which can be initiated as soon as the next mandrel 4 comes into the loading station opposite device 6.

Although one embodiment of my invention has been described in detail with reference to the accompanying drawings, it should be understood that various changes in the shape, sizes and arrangement of parts could be resorted to without departing from the spirit of the invention or sacrificing the advantages thereof.

I claim:

1. A loading device for use with a machine performing working operations on tubular workpieces and having a guiding member periodically moved into a loading station for receiving a new workpiece, in combination, a transporting member mounted for rocking motion about a fixed axis between a receiving position and a loading position in which it is aligned with the guiding member standing at the loading station, said transporting member comprising a rod adapted for receiving the workpieces and a pusher being shiftably mounted on said rod for moving the workpiece carried thereby in an axial direction with respect thereto, distributing means adapted for delivering a workpiece to said transporting member when the same is in its receiving position, a control member mounted for shifting motion in a direction parallel to the guiding member standing at the loading station and adapted for causing the workpiece carried by said transporting member to be shifted axially from this transporting member onto the guiding member standing at the loading station when said transporting member is in its loading position, connecting means inserted between control member and said transporting member, said connecting means comprising cooperating camming means arranged in part on the control member and in part on said pusher, said connecting means causing said transporting member to be rocked from its receiving position into its loading position when said control member starts its loading stroke and to be rocked from its loading position into its receiving position when said control member ends its return stroke.

2. A loading device according to claim 1, the part of the camming means arranged on the control member consisting of a triangular cam and the part of the camming means arranged on the pusher consisting of a V-shaped surface thereof matching with said cam.

3. A loading device according to claim 1, the distributing means comprising an inclined tubular chute aligned with the rod of the transporting member when the latter is in its receiving position.

References Cited by the Examiner
UNITED STATES PATENTS

| | | |
|---|---|---|
| 1,839,438 | 1/32 | Prussing. |
| 2,175,560 | 10/39 | Friden. |
| 2,433,076 | 12/47 | Weckstein _____ 198—22 X |
| 2,914,162 | 11/59 | Anger. |
| 2,991,881 | 7/61 | Craven _____ 221—290 X |

HUGO O. SCHULZ, *Primary Examiner.*